United States Patent [19]

Beernink

[11] Patent Number: 5,615,285

[45] Date of Patent: Mar. 25, 1997

[54] METHOD AND APPARATUS FOR RECOGNIZING HANDWRITTEN WORDS

[75] Inventor: Ernest H. Beernink, San Carlos, Calif.

[73] Assignee: Apple Computer, Inc., Cupertino, Calif.

[21] Appl. No.: 478,728

[22] Filed: Jun. 6, 1995

Related U.S. Application Data

[63] Continuation of Ser. No. 265,497, Jun. 23, 1994, which is a continuation of Ser. No. 68,443, May 27, 1993, abandoned, which is a continuation-in-part of Ser. No. 889,216, May 27, 1992, abandoned, and a continuation-in-part of Ser. No. 1,123, Jan. 5, 1993, abandoned.

[51] Int. Cl.⁶ .................................................. G06K 9/00
[52] U.S. Cl. ............................................ 382/189; 382/290
[58] Field of Search .......................... 382/173, 181, 382/187, 199, 203, 209, 218, 282, 155, 159, 160, 161, 177, 178, 179, 185, 186, 188, 189, 190, 198, 200, 202, 217, 224, 229, 288, 286, 290, 292, 293, 296, 227, 315; 364/419.11, 920.4, 926.9, 927, 927.2, 925.6

[56] References Cited

U.S. PATENT DOCUMENTS

| | | | |
|---|---|---|---|
| 4,718,102 | 1/1988 | Crane et al. | 382/13 |
| 5,157,737 | 10/1992 | Sklarew | 382/13 |

*Primary Examiner*—Leo Boudreau
*Assistant Examiner*—Bijan Tadayon
*Attorney, Agent, or Firm*—Hickman Beyer & Weaver

[57] ABSTRACT

A method for the angle-independent recognition of handwritten objects including: a) receiving a handwritten stroke; b) normalizing the stroke; c) matching the normalized stroke against a stroke database to obtain at least one character part interpretation; and d) recognizing a handwritten object using one or more of the character part interpretations. Preferably, the step of normalizing the stroke includes the step of normalizing an angle of the stroke by first determining a stroke angle and then rotating the stroke by the stroke angle until the stroke is at a normalized position. An apparatus for the angle independent recognition of handwritten objects includes: a) a central processing unit (CPU); b) a pointer mechanism coupled to the CPU for providing a handwritten stroke to the CPU; c) a mechanism for normalizing the strokes provided by the pointer mechanism; d) a mechanism for matching the normalized strokes against a stroke database to obtain a number of character part interpretations; and e) a mechanism for recognizing a handwritten object using the character part interpretations. Preferably, the mechanism for normalizing the strokes includes a mechanism for detecting stroke angles of the strokes, and a mechanism for rotating the strokes by the stroke angles to create normalized strokes. The mechanism for recognizing the handwritten object preferably includes a controller, a number of recognition domains coupled to the controller, and an arbiter coupled to the controller for resolving multiple interpretations of the object.

6 Claims, 20 Drawing Sheets

WORD UNIT

METHOD AND APPARATUS FOR RECOGNIZING HANDWRITTEN WORDS

This is a continuation of copending application Ser. No. 08/265,497, filed on Jun. 23, 1994, which is a continuation of application Ser. No. 08/068,443, now abandoned filed May 27, 1993, which is a continuation in part of application Ser. No. 07/889,216, now abandoned filed May 27, 1992 and a continuation in part of application Ser. No. 08/001,123, filed Jan. 5, 1993 now abandoned.

BACKGROUND OF THE INVENTION

This invention relates generally to handwriting recognition, and more particularly to handwriting recognition in a pen-based computer system.

A pen-based computer system typically comprises a small, hand-held computer where the primary method for inputting data includes a "pen" or stylus which "writes" upon the screen of the computer system. The screen is a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. Besides serving as a notepad, pen-based computers can provide a number of useful functions, such as serving as an address book, an appointment calendar, a to-do list, etc.

Ink on the screen of a pen-based computer system is typically stored as a simple bit-map. Essentially, the only knowledge that the computer system has of the inked image is that certain pixels of the display are to be activated to create the inked image. Therefore a note, such as "Meet Bob Tuesday" has no meaning to the system other than certain pixels of the screen are to be turned on or off to create the inked image of the words.

It is often desirable to perform some level of recognition on the inked objects formed on the computer screen. In this way, additional meaning can be attached to the inked objects allowing the computer to manipulate the objects in a more intelligent fashion. For example, a common operation for pen-based computer systems is handwriting recognition. In this way, the inked object "Meet Bob Tuesday", can be "recognized" as comprising three words separated by spaces where each word comprises a number of letters. The recognized words and letters can be converted into an appealing font, and can be used and manipulated as words and letters rather than as bits in a bit-map.

There are a great many methods for recognizing handwriting known in the prior art. However, these recognition methods tend to be narrowly focused on a particular type of recognition task. For example, there are prior art recognizers for recognizing alphanumeric inputs, for recognizing graphical inputs, etc. If a recognizer of the prior art does not recognize a particular type of object that object is typically treated as ink.

Most handwriting recognizers require that a user enter handwritten information in a constrained manner. For example, many handwriting recognizers require that letters be entered in "block" form, rather than in a cursive fashion. Other word recognizers require that words be entered in particular fields or areas of the screen. Most handwriting recognizers require that words be written in a substantially horizontal manner from left to right.

These constraints limit the flexibility of handwriting recognizers, and takes some of the creativity and enjoyment out of the use of a pen computer system. It would be desirable to have a method and apparatus for recognizing handwritten words which would allow the characters of the word to be written in a free-form fashion at any angle, in any direction or order, and virtually anywhere on the screen of a pen computer system.

SUMMARY OF THE INVENTION

A character based word recognizer in accordance with the present invention allows words to be entered into a pen computer system at virtually any angle, in any direction, and virtually anywhere on the screen of the computer system. This permits, for example, words to be written horizontally, vertically, or any angle in between. Also, letters may be written at an angle to the baseline of the word of which they form a part. The word recognizer of the present invention also permits the letters of a word to be written in any order, e.g. the word "the" can be entered by first entering an e, then entering an h to the left of the e, and then entering a t to the left of the h.

A method for the angle independent recognition of handwritten objects in accordance with the present invention includes the steps of: a) receiving a handwritten stroke; b) normalizing the stroke; c) matching the normalized stroke against a stroke database to obtain at least one character part interpretation; and d) recognizing a handwritten object using one or more of the character part interpretations. The step of normalizing the stroke preferably comprises normalizing an angle of the stroke to create an angle-normalized stroke. By angle-normalizing a stroke prior to matching it into a stroke database, the angle and orientation of the stroke relative to a baseline of a word or to an arbitrary (x,y) coordinate system becomes much less relevant in determining the nature of that stroke. Preferably, the step of normalizing also includes the step of normalizing an aspect ratio of the stroke to avoid recognition errors due to distortion.

An apparatus for the angle independent recognition of handwritten objects includes: a) a central processing unit (CPU); b) a pointer mechanism coupled to the CPU for providing a handwritten stroke to the CPU; c) a mechanism for normalizing the strokes provided by the pointing mechanism; d) a mechanism for matching the normalized strokes against a stroke database to obtain a number of character part interpretations; and e) a mechanism for recognizing a handwritten object using the character part interpretations. The mechanism for normalizing the strokes preferably includes a mechanism for detecting stroke angles, and a mechanism for rotating the strokes by the stroke angles to create normalized strokes. The mechanism for normalizing strokes can further include a mechanism for detecting the aspect ratios of the strokes, and a mechanism for normalizing the aspect ratios of the strokes if the aspect ratios are not within predetermined limits. The mechanism for matching the normalized strokes preferably includes a stroke template database having a number of stroke template entries corresponding to a number of character parts. The mechanism for recognizing a handwritten object preferably includes a controller, a number of recognition domains coupled to the controller, and an arbiter coupled to the controller for resolving multiple interpretations of the object.

These and other advantages of the present invention will become apparent upon a reading of the following descriptions and a study of the various figures of the drawing.

DETAILED DESCRIPTION OF THE PREFERRED EMBODIMENTS

The present invention is well suited for pointer based computer systems such as the pen-based, stylus-based and mouse driven systems that are currently popular. For the purposes of illustration, the invention will be described in connection with a pen-based system.

Figure 1:
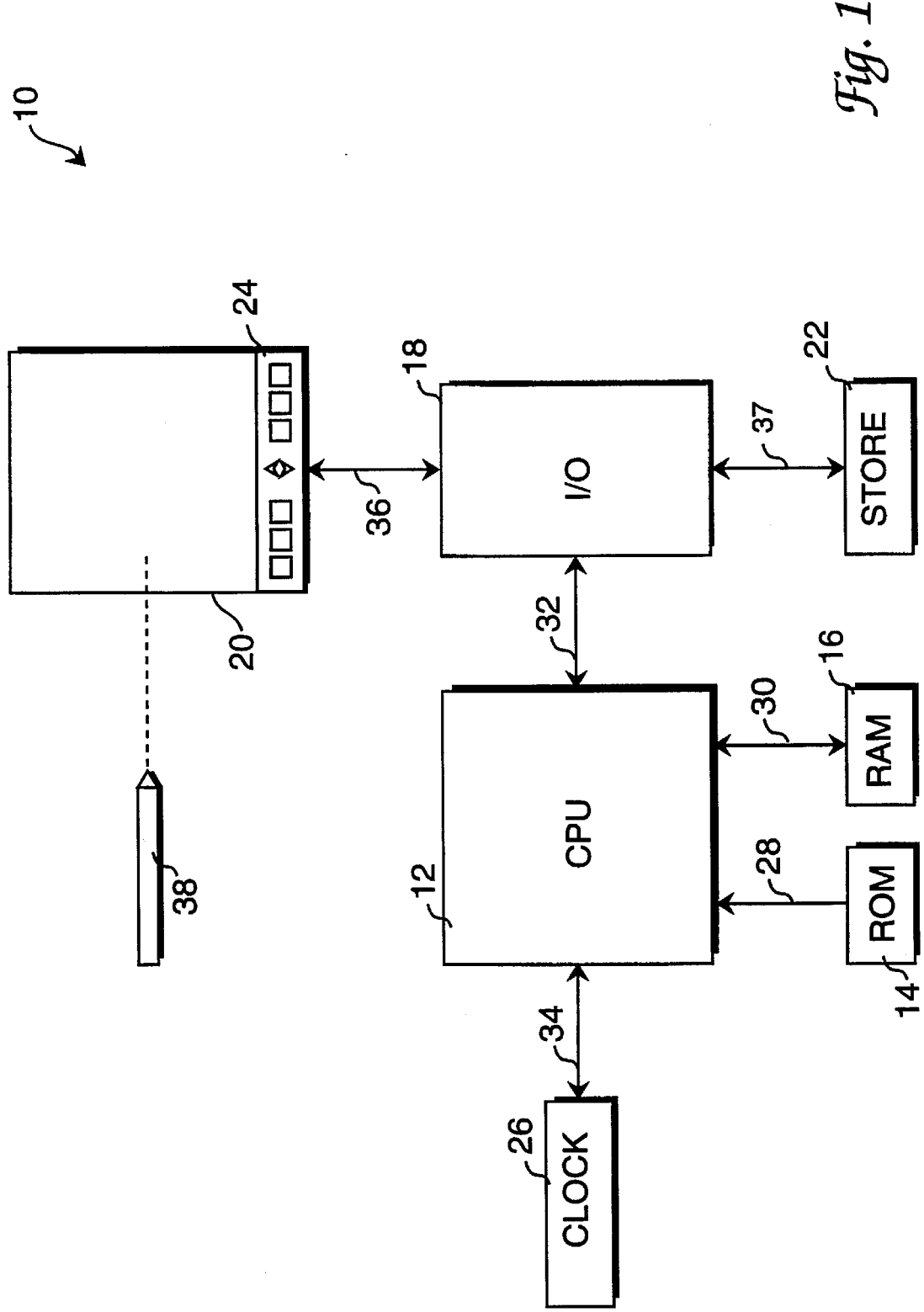
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 provides clock data and is typically coupled to a port of CPU 12 by a data line 34. The clock data is used to time various functions and events relating to the computer system 10. The clock 26 can be eliminated and the clock function replace by a software clock running on CPU 12, but this tends to be a wasteful use of CPU processing power.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. The membrane covering the screen therefore serves as an input "tablet." These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises "button" areas which overlie the bottom edge of the membrane which covers the LCD display. When the "buttons" are depressed, the membrane senses the pressure and communicates that fact to the CPU 12 via I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. Mass storage 22 can be coupled to I/O circuitry 18 by a bi-directional data bus 37. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, non-volatile memory such as flash memory, battery backed RAM, PC-data cards, or the like.

In operation, information is input into the pen-based computer system 10 by "writing" on the screen of display assembly 20 with a stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
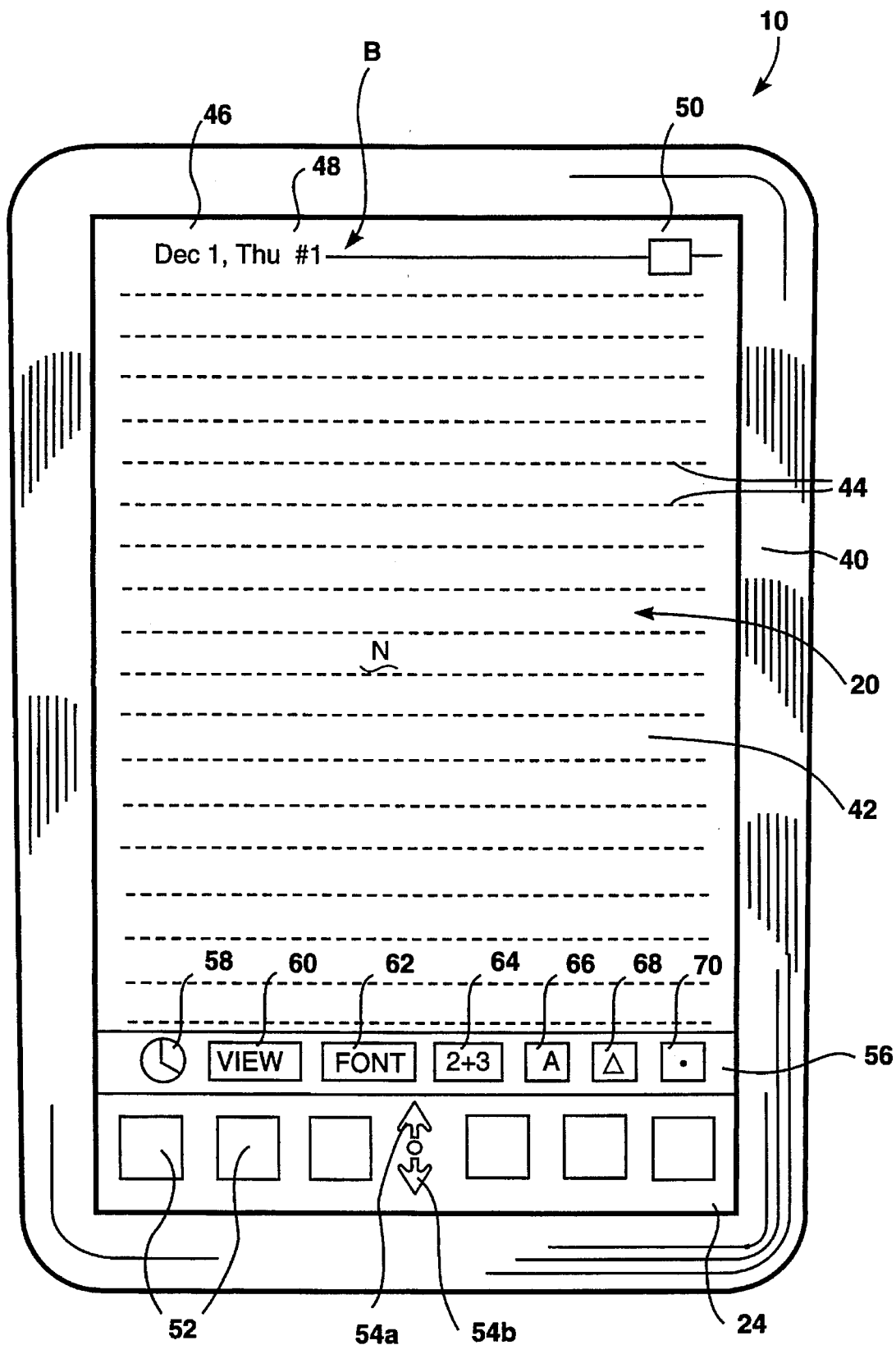
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50. The optional guidelines 44 aid a user in entering text, graphics, and data into the pen-based computer system 10.

The keypad 24 preferably includes a number of dedicated function "buttons" 52 and a pair of scroll "buttons" 54A and 54B. The operation of the scroll buttons 54A and 54B, and other aspects of computer system 10 are discussed in greater detail in co-pending U.S. patent application Ser. No. 07/868,013, filed Apr. 13, 1992 on behalf of Tchao et al., entitled "Method for Manipulating Notes on a Computer Display", and assigned to the same assignee as the present application, the disclosure of which is hereby incorporated herein in its entirety.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, a formulas button 64, a text button 66, a graphics button 68, and a nib button 70. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

Figure 3:
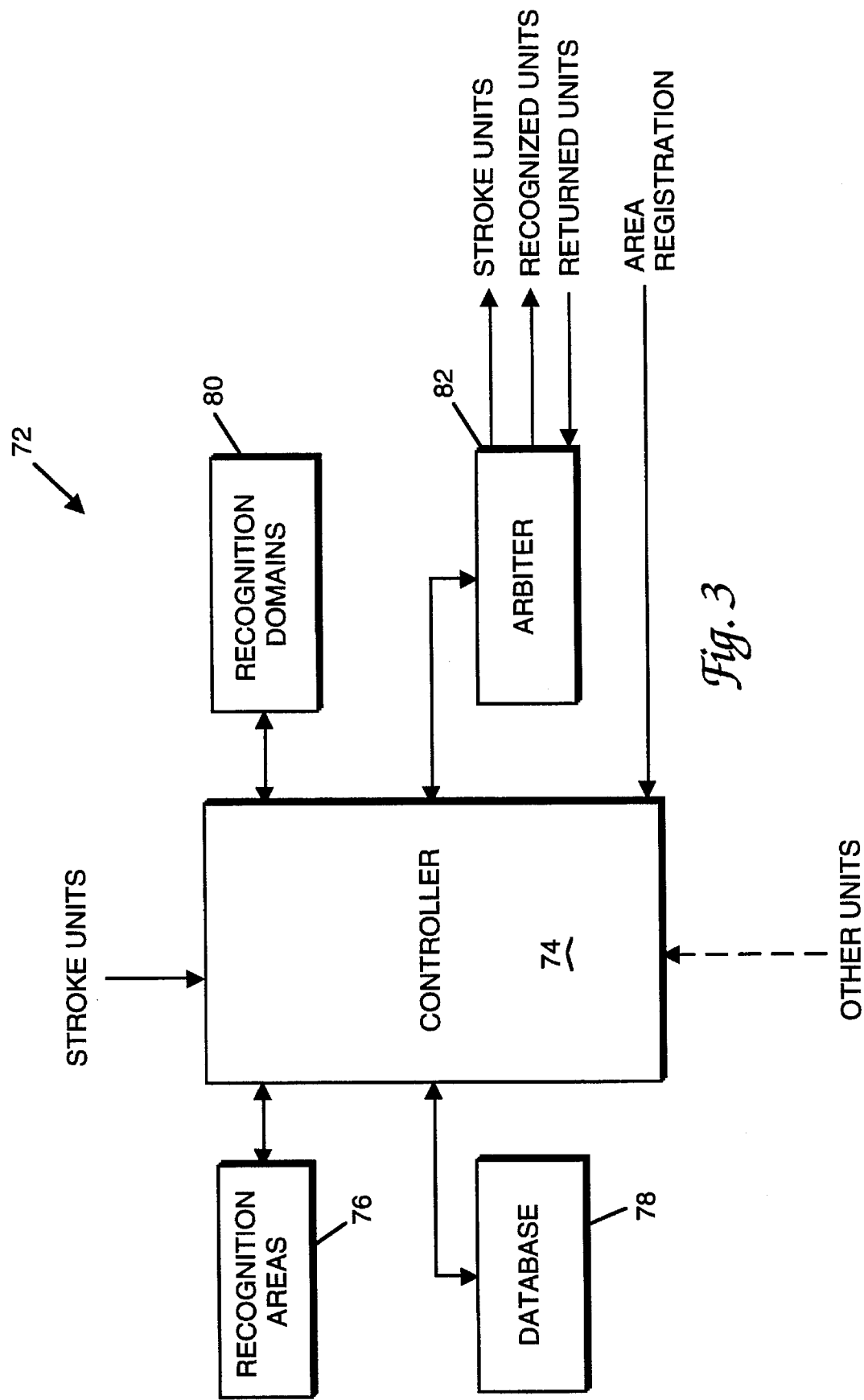
FIG. 3 is a block diagram of a word recognition system in accordance with the present invention.

In FIG. 3, the structure of the recognition system 72 of the present invention is illustrated. The recognition system 72 includes a controller 74, recognition areas 76, a database 78, recognition domains 80, and an arbiter 82. The controller 74 has, as inputs, stroke units, other types of units (optional), and area registration information. The arbiter 136 has an input for returned units from an application program, and has outputs for stroke units and recognized units. The construction and operation of recognition system 72 is described in greater detail in copending Parent Patent Application U.S. Ser. No. 08/001,123, filed Jan. 5, 1993, previously incorporated by reference.

Figure 4:
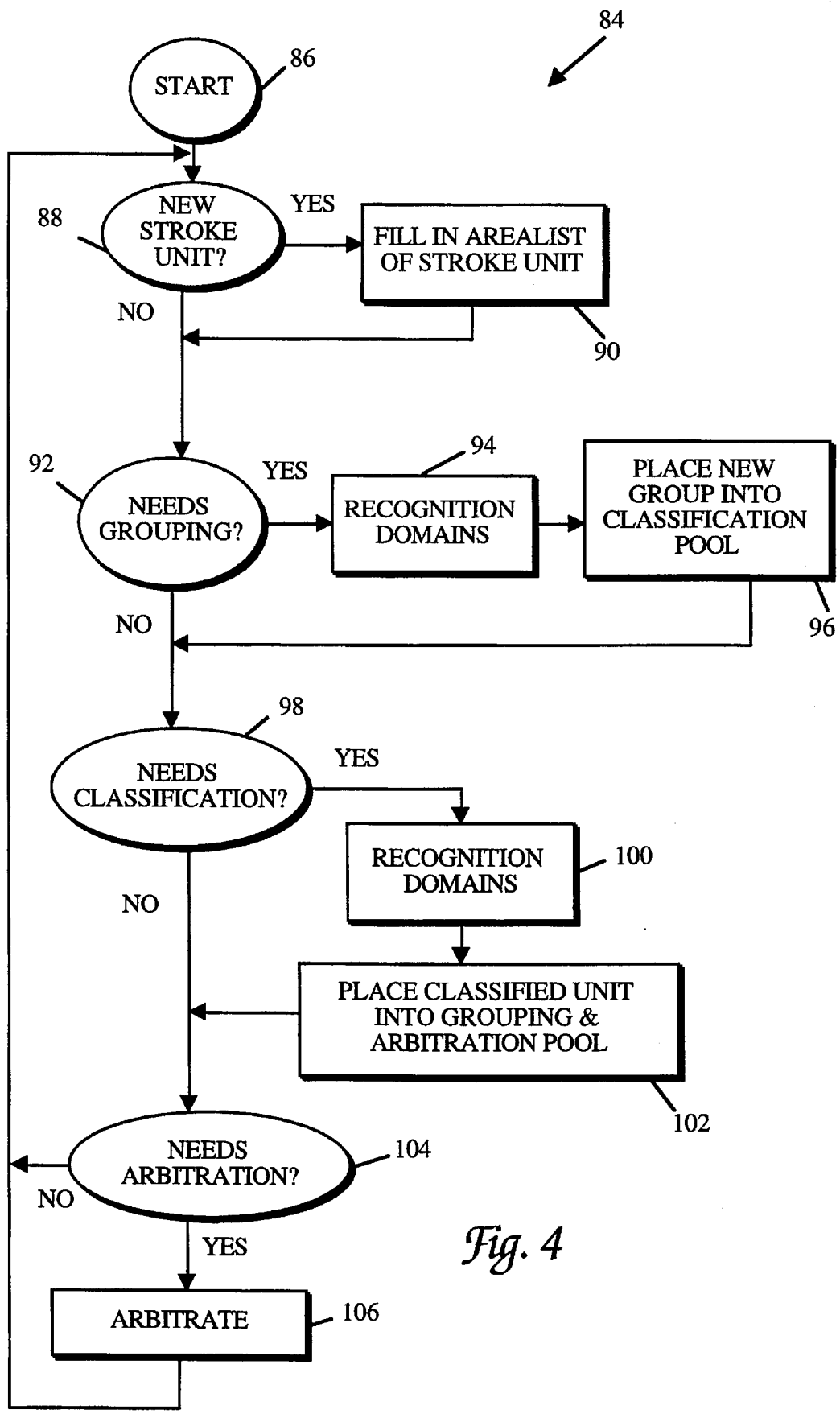
FIG. 4 is a flow diagram illustrating a computer implemented process of the word recognizer illustrated in FIG. 3.
Figure 8:
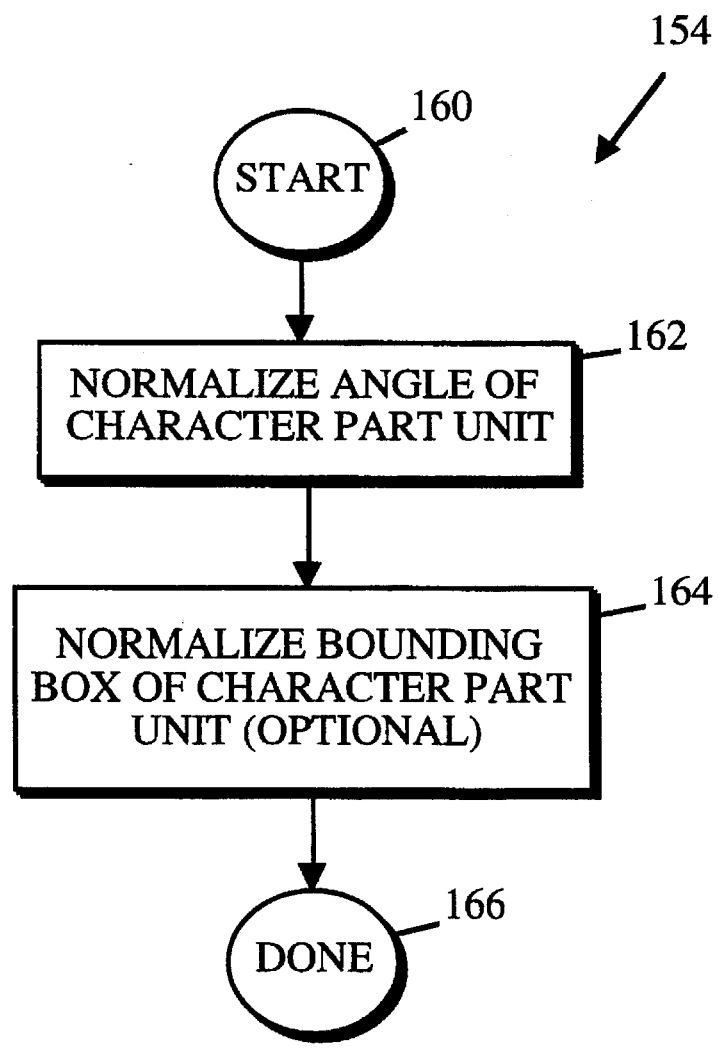
FIG. 8 is a flow diagram illustrating the "NORMALIZE STROKE" step of FIG. 7.

FIG. 4 is a flow diagram illustrating the operation of the controller 74 of FIG. 8. A computer implemented process 84 begins at 86 and, in a step 88, it is determined whether the unit comprises a new stroke. If it does, the AREALIST of the stroke unit is filled-in in a step 90. In a step 92, it is determined whether any unit needs grouping. If it does, each unit is passed to the recognition domains in a step 94, and each new group unit is moved into a "classification pool" in a step 96.

In step 98, it is determined whether any unit needs classification. If it does, each unit is passed to the recognition domains in a step 100, and a step 102 places each classified unit into a "grouping and arbitration pool." A step 104 determines whether arbitration is required, and if it is, each unit is arbitrated in a step 106. If no arbitration is needed, or after arbitration is completed, process control returns to step 88.

The process 84 of FIG. 4 and its interactions with the classification pool and the grouping an arbitration pool is described in detail in copending U.S. patent application Ser. No. 08/001,123, supra.

Figure 5:
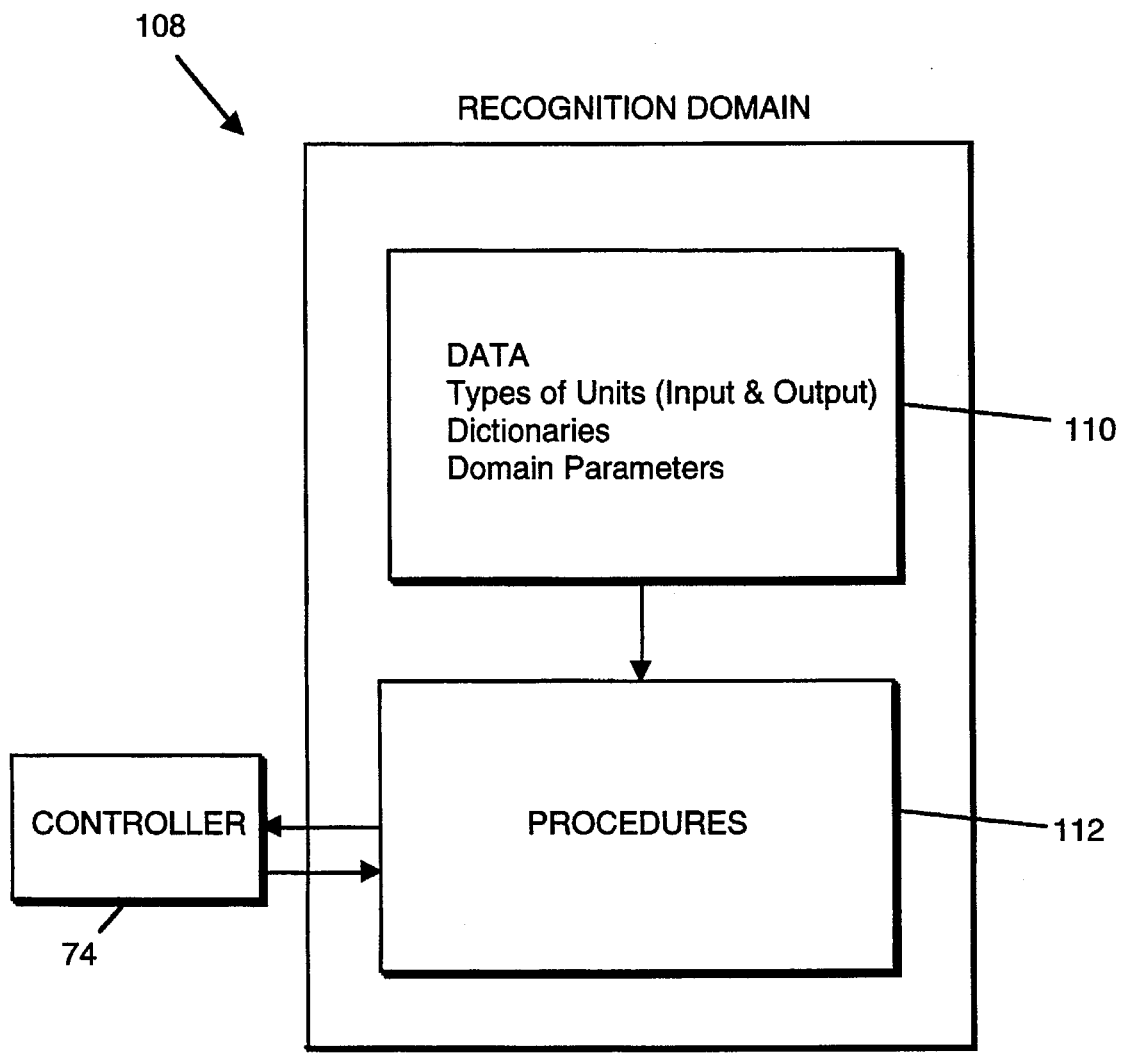
FIG. 5 is a block diagram illustrating a recognition domain of FIG. 3.

FIG. 5 illustrates a recognition domain 108 which may be one of the recognition domains 80 of FIG. 8. This recognition domain 108 is an "object" including a data portion 110 and a procedures portion 112. The procedures portion 112 communicates with the controller 74 in a dialogue-like fashion. The procedures portion 112 has access to the data portion 110, which includes such data as the type of units recognized by the recognition domain 108, dictionaries, and domain parameters. Each domain 80 has both grouping and classification capabilities.

In the present invention, a character part ("CHARPART") domain and a word ("WORD") domain are provided, where words are deduced directly from character parts. In alternate embodiments of the present invention, a character ("CHAR- ACTER") domain can be provided to deduce characters from the CHARPART domain, and such that words can be deduced from the CHARACTER domain. However, it has been found that better recognition is possible with the present invention by deducing words directly from character parts.

The term "object" has been Used extensively in the preceding discussions. As is well known to software developers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well know texts which describe object oriented programming. See, for example, Object Oriented Programming for the Macintosh, by Kurt J. Schmucher, Hayden Book Company, 1986. Since the definition of "object" has been somewhat loosely used in the industry, we will refer to a certain types of objects as "units." More particularly, we will refer to STROKE UNITS, CHARPART UNITS, and WORD UNITS, it being understood that these units are "objects" of a particular type and format.

Figure 6:
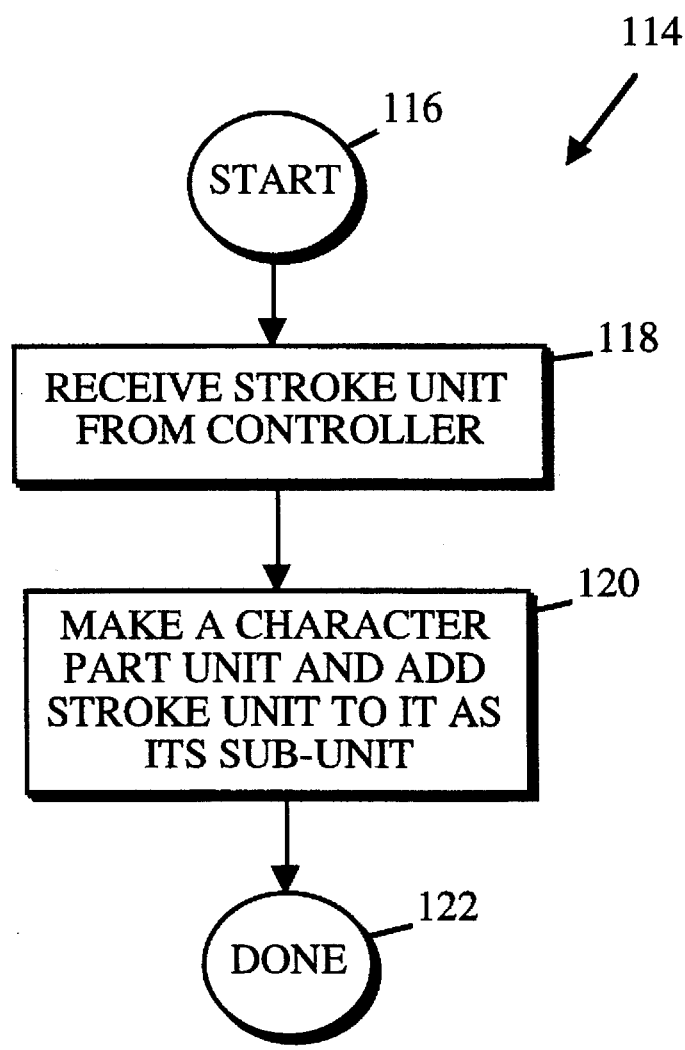
FIG. 6 is a flow diagram illustrating a "NEEDS GROUPING" call to a character part recognition domain of FIG. 4.
Figure 6A:
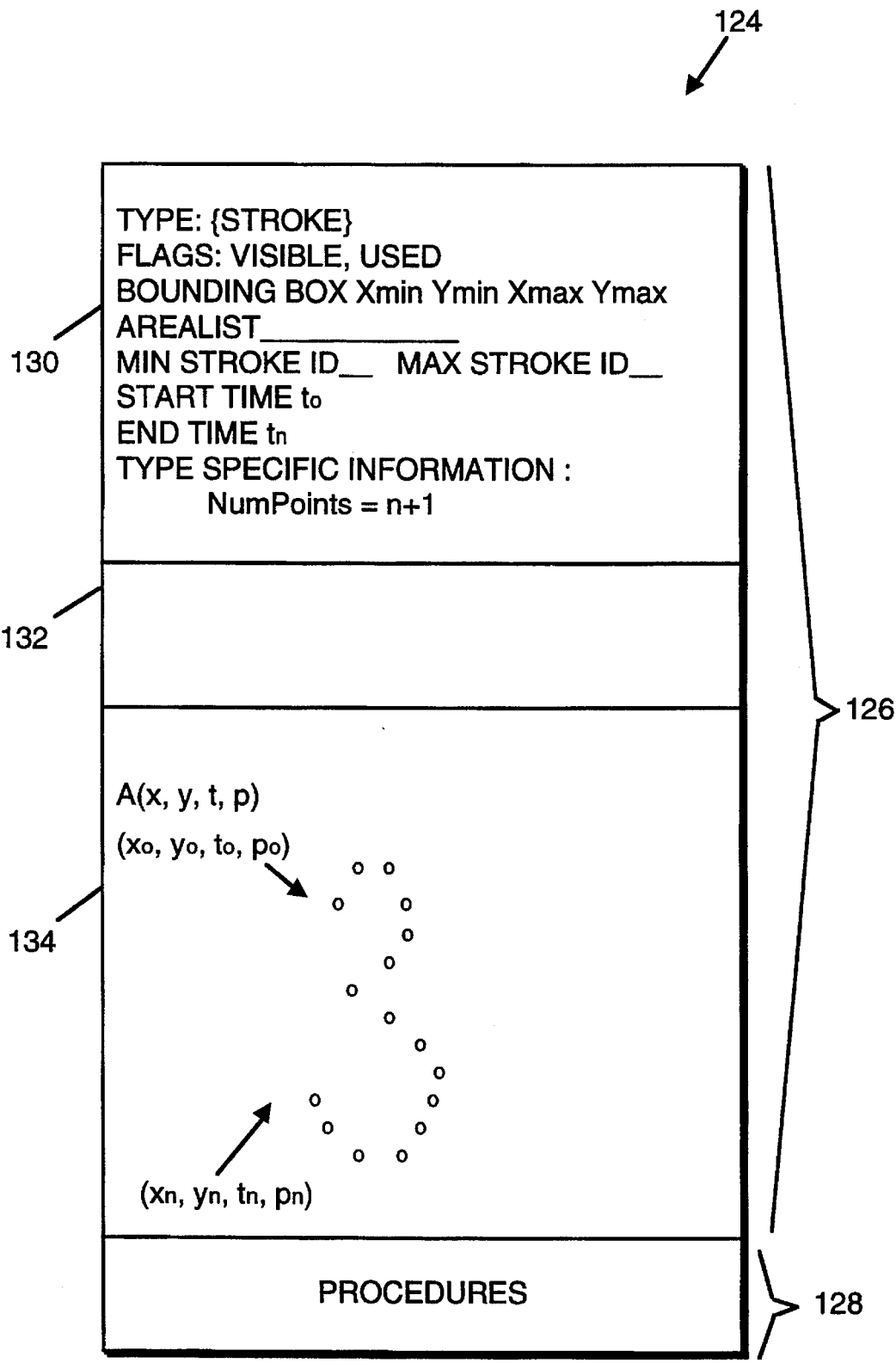
FIG. 6(a) is a pictorial representation of a STROKE UNIT.

A STROKE UNIT 124 as received by step 118 of FIG. 6 is shown in FIG. 6a. Like all computerized objects, a STROKE UNIT 124 includes a data portion 126 and a procedures portion 128. The data portion 126 is broken into three sections, namely, generic data 130, subunit data 132, and interpretation data 134. The genetic data section includes a variety of information such as the type of unit (which in this case is a stroke unit) certain flags (such as Visible and Used), the bounding box for the stroke as defined by $x_{min}$, $y_{min}$, $x_{max}$, $y_{max}$, the AREALIST, the minimum stroke identification of the unit (minSTROKEID) the maximum stroke identification of the unit (maxSTROKEID), and various type specific information such as the number of points in the stroke. The subunit data field 132 includes information concerning any subunits of the STROKE UNIT 124. The interpretation data 134 includes the array of data points A (x, y, t, p) which is graphically illustrated in FIG. 6. Of course, in the computer system 10, these data points are stored as an array or queue of binary numbers. Preferably, a queue A extends from the first data point $(x_0, y_0, t_0, p_0)$ to the n+1 data point, $(x_n, y_n, t_n, p_n)$. The procedures portion 128 of the stroke unit provides the necessary methods and processes for the STROKE UNIT 124 to operate as an autonomous object, as is well known to those skilled and the art.

Figure 6B:
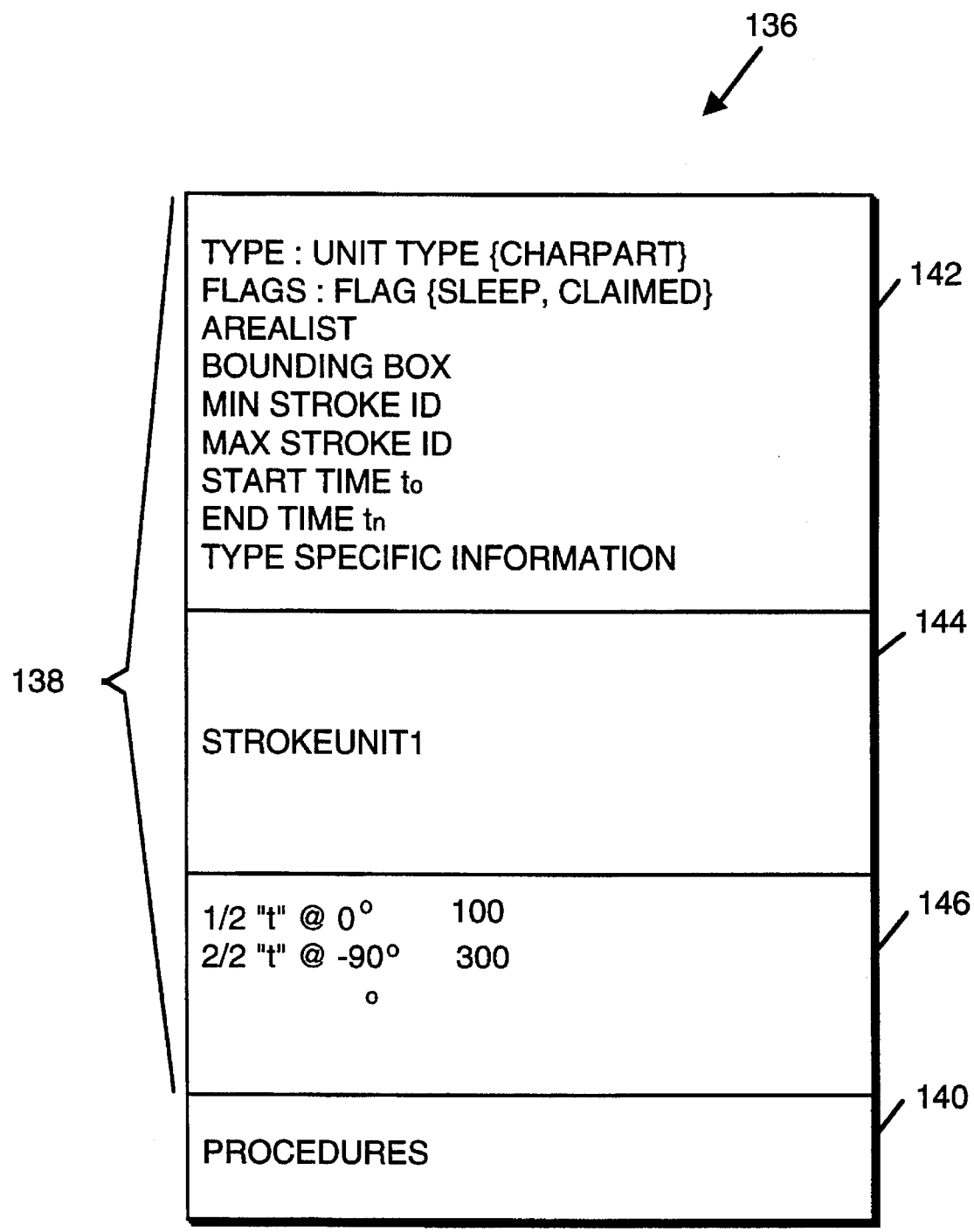
FIG. 6(b) is a pictorial representation of a CHARPART UNIT of the present invention.

FIG. 6b is used to illustrate a CHARPART UNIT produced by step 120 of FIG. 6. A CHARPART UNIT 136 includes a data portion 138 and a procedures portion 140. The data portion 138 includes a generic section 142, a subunit section 144, and an interpretation section 146. The generic section includes data types which will be found in all unit structures. For example, the generic section will include the type (which in this case is CHARPART), flags such as sleep and claimed, an AREALIST, a bounding box, minSTROKEID, maxSTROKEID, and type specific information. The subunit section 144 will contain subunits of the unit 136, which in this instance is STROKEUNIT1. The interpretation data section 146 is a list of the interpretations for the unit 138 with their rankings. Not all possible interpretations are shown in this illustration. The lower the rank number of the interpretation, the higher the level of confidence that the object has been recognized correctly. The procedures portion 140 include methods and processes which allow the unit to operate as an object.

As used herein, a STROKE and a CHARPART UNIT might be used somewhat interchangeably. Each CHARPART UNIT contains but a single STROKE UNIT. Therefore, at times a rotation of a stroke forming a part of a STROKE UNIT which is a subunit of a CHARPART UNIT will be referred to as a rotation of a CHARPART, and vice versa. In actuality, it is a private copy of the stroke owned by the CHARPART UNIT that is rotated, since the stroke unit itself should not be modified.

Figure 7:
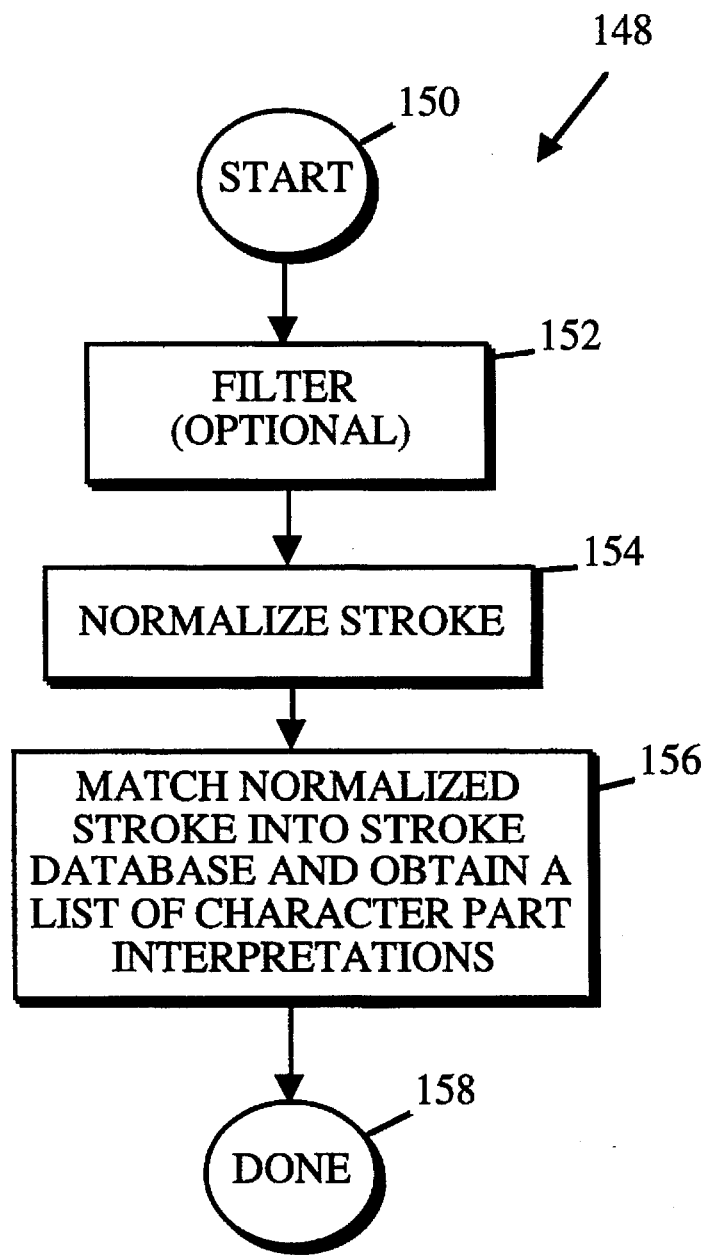
FIG. 7 is a flow diagram illustrating a "NEEDS CLASSIFICATION" call to a CHARPART recognition domain in FIG. 4.

FIG. 7 illustrates a computer-implemented process 148 undertaken by a character part recognition domain 100 after a "NEEDS CLASSIFICATION" call 98 of FIG. 4. Process 148 begins at 150 and, in an optional step 152, the incoming stroke unit is filtered. This filtering process can, for example, take the form of dividing the incoming stroke into sixteen equally spaced segments which replaces the multiplicity of randomly spaced segments of an incoming raw stroke. Such "filtering" helps optimize the process, but is not an indispensable part of the present invention. Next, in a step 154, the incoming stroke is normalized. Other implementation features might be extracted from the normalized stroke at this time. Finally, in a step 156, the normalized stroke is matched into a stroke data base to obtain a list of charter part interpretations. The process 148 is then completed as indicated at 158.

FIG. 8 is a flow diagram illustrating the "NORMALIZE STROKE" step 154 of FIG. 7 in greater detail. Process 154 begins at 160 and, in a step 162, the angle of the character part unit is normalized. Next, in a step 154, the bounding box of the character part unit is also normalized. This bounding box normalization step 164 is optional, and again is provided as an optional optimization technique. The process 154 is then completed as indicated at 166.

Figure 9:
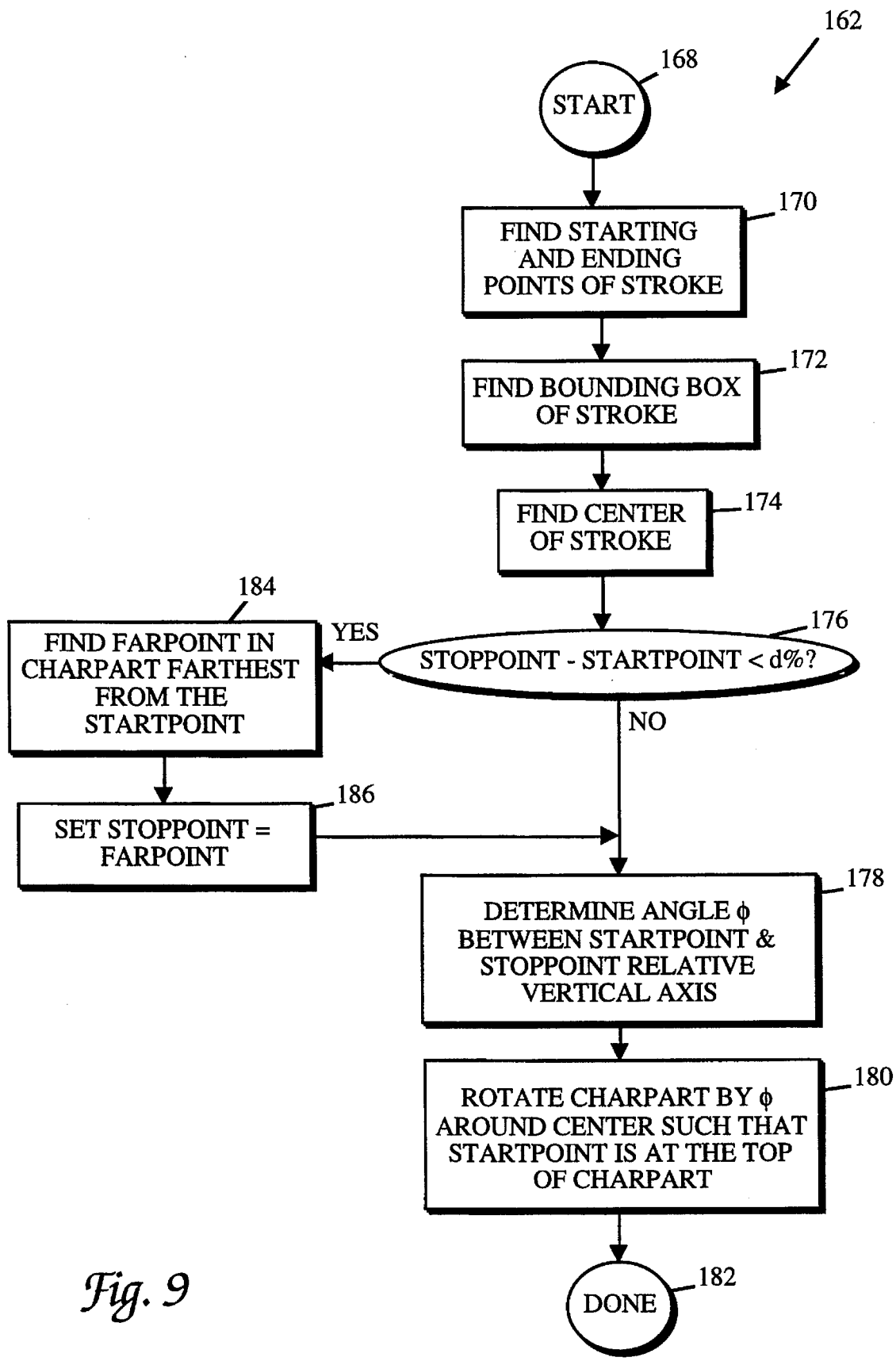
FIG. 9 is a flow diagram illustrating the "NORMALIZE ANGLE" step of FIG. 8.
Figure 9A:
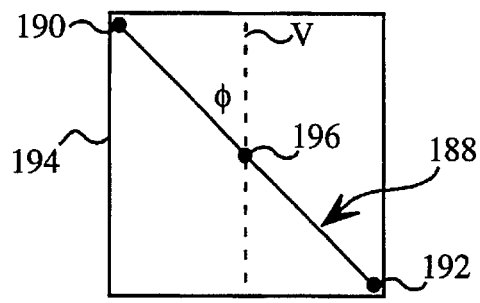
FIGS. 9a–9d are used to illustrate the process 162 of FIG. 9.
Figure 9B:
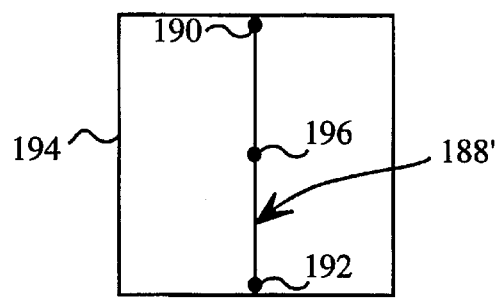

FIG. 9 is a flow diagram illustrating the "NORMALIZE ANGLE" step 162 of FIG. 8 in greater detail. The process 162 begins at 168 and, in a step 170, the starting and ending points of the stroke are determined. Next, in a step 172, the bounding box of the stroke is determined. As is well known to those skilled in the art, the "bounding box" is the minimum rectilinear box which fully encloses the stroke. Next, in a step 174, the center of the stroke is located. A Subsequent decision step 176 compares the distance between STOPPOINT and STARTPOINT (the starting and ending points of the stroke) and compares them to a distance which is a percentage of the length of the stroke, e.g., one-third of the width of the bounding box of the stroke. In other words, step 176 calculates STOPPOINT minus STARTPOINT and, if the difference is greater than or equal to the distance d%, then step 178 is performed. The distance d% is derived by the size of the bounding box. Step 178 determines the angle φ between STARTPOINT and STOPPOINT relative to the vertical axis. As explained previously, the pixels of the screen 42 are arranged in a Cartesian-coordinate system such that the vertical axis is parallel to a "Y" axis of the screen 42. Next, in a step 180, CHARPART is rotated by φ around its center such that the STARTPOINT of the stroke is located at the top of CHARPART. The process is then completed as indicated at 182.

If the result of the decision step 176 is in the affirmative, a step 184 finds a FARPOINT in the CHARPART which is farthest from STARTPOINT. This would be the case with a substantially circular item. Next, in a step 186, the STOPPOINT is set to the FARPOINT. Thereafter, steps 178 and 180 are performed and the process is again completed at 182.

FIGS. 9a–9d illustrate the process 162 of FIG. 9. If, for example, a stroke unit enters the process 162 having a stroke 188, its starting and ending points are determined at 190 and 192. The bounding box 194 is then determined by step 172 and the center 196 of the stroke 188 is then determined by step 174. Since STOPPOINT 192 minus STARTPOINT 190 is much greater than one-third the distance between those points (e.g. d%), step 176 determines the process control should be turned over to step 178. In step 178, the angle φ between STARTPOINT 190 and STOPPOINT 192 relative to a vertical axis V is determined, and in a step 180 the stroke of CHARPART is rotated by φ around the center 196 such that the STARTPOINT 190 is at the top of the CHARPART.

Figure 9C:
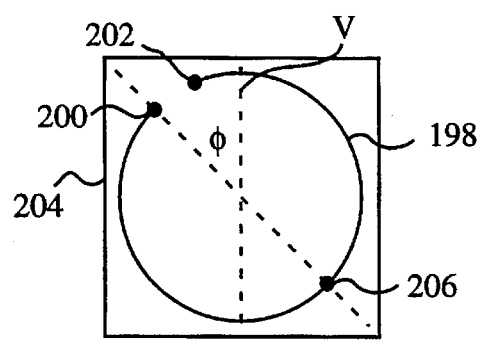
Figure 9D:
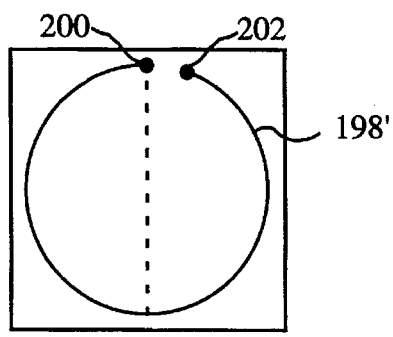

In FIG. 9c a CHARPART having a stroke 198 is entered and the starting and ending points are determined by step 170 to be STARTPOINT 200 and STOPPOINT 202. Again, the bounding box 204 is determined by step 172 and the center of the stroke 206 is determined by step 174. In this instance, step 176 determines that the distance between STOPPOINT 202 and STARTPOINT 200 is less than one-third of the width of the bounding box and, therefore, process control is turned over to step 184. Next, in a step 184, the point FARPOINT is determined by comparing all of the points of the stroke 198 to STARTPOINT 200 to determine which is the farthest away from the STARTPOINT 200. This point FARPOINT should be fairly close to the center point 206. Next, in a step 186, the stop point is set to the value of FARPOINT. In step 178 the angle φ between STARTPOINT and STOPPOINT relative to the vertical axis v is again calculated, and in step 180 the CHARPART is rotated by φ around its center such that the STARTPOINT 200 is at the top of the CHARPART.

This rotation process illustrated in FIG. 9 and 9a–9d is fundamental to providing a word recognizer which is angle and direction independent. Since all character parts are rotated or normalized by the process 162, the actual angle that they are presented on the screen does not affect the recognition process.

Figure 10:
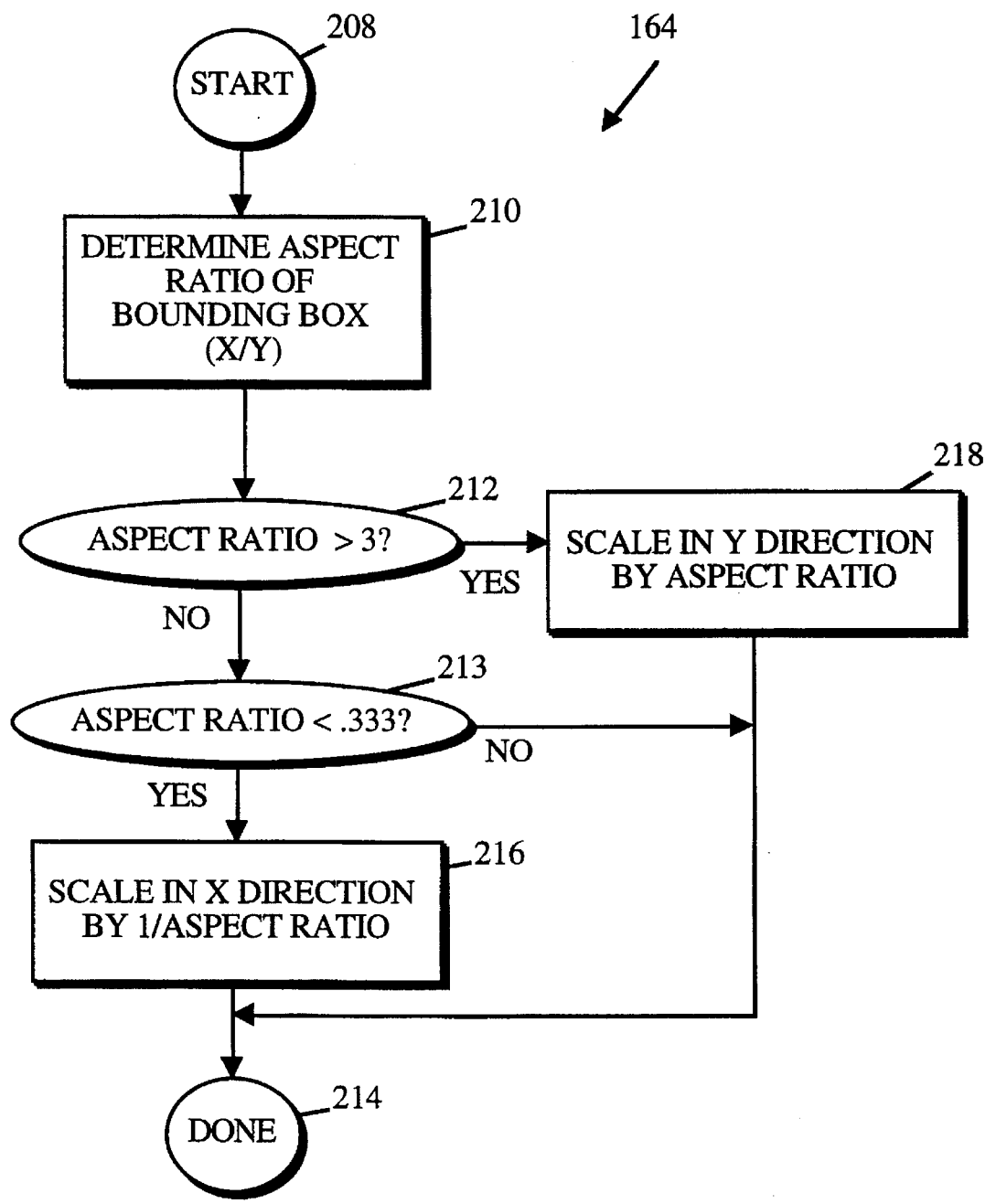
FIG. 10 is a flow diagram illustrating the "NORMALIZE BOUNDING BOX" step of FIG. 8.

FIG. 10 illustrates the optional step 164 of FIG. 8 in further detail. In the step 164, the aspect ratio of the bounding box is determined and, if it is too severe, the CHARPART is scaled appropriately to bring the aspect ratio of the bounding box within a predetermined criteria. It has been determined empirically that if the aspect ratio defined as the width of the bounding box divided by the height of the bounding box is greater than 3 or less than ⅓ that the word recognition process can be improved by bringing the aspect ratio within these limits. More specifically, the process 164 begins at 208 and, in a step 210, the aspect ratio of the bounding box is calculated. As mentioned previously, this aspect ratio is simply determined by dividing the width of the bounding box in the X direction by the height of the box in the Y direction, i.e. x/y. Next, in a decision step 212, it is determined whether the aspect ratio is greater than 3. If not, a step 213 determines whether the aspect ratio is less than ⅓, i.e. less than 0.333. If not, the aspect ratio is within reasonable limits and the process is completed at 214. If the aspect ratio is less than 0.333, the CHARPART is scaled in an X direction by a factor of the reciprocal of the aspect ratio, and the process is completed at 214. If the aspect ratio is greater than 3, a step 215 scales the CHARPART in a Y direction by the aspect ratio and the process is again completed at 214.

Figure 11:
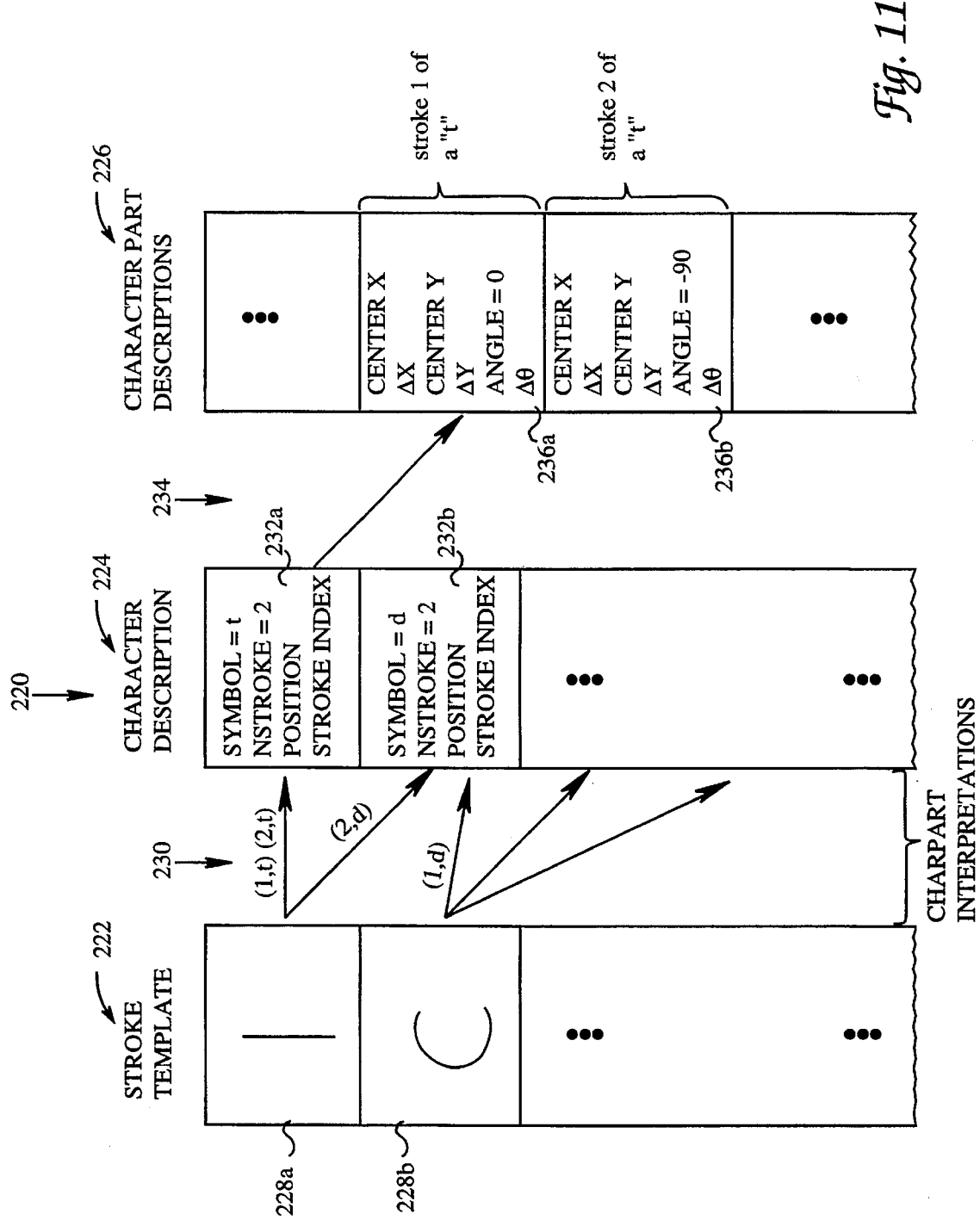
FIG. 11 is a diagram of the database structure used in the "MATCH NORMALIZED STROKE" step of FIG. 7.

FIG. 11 illustrates the data structure used by the step 156 "MATCH NORMALIZE STROKE" of FIG. 7. The database 220 includes a stroke template portion 222, a character description portion 224 and a character part description portion 226. A stroke template portion 222 includes a number of stroke template entries 228a, 228b, etc. for matching against stroke parts. The stroke template can be either stroke or feature based, although a stroke based template is preferred in this present invention. Methods for implementing stroke and feature based templates are well known to those skilled in the art.

The stroke template 222 includes a plurality of pointers 230 which point to various locations in a character description 224. For example, for stroke template entry 228a, which is a vertical line, a plurality of pointers 230 point to character description areas 232a, 232b, etc. In other words, a match against stroke template entry 228a might be the first stroke of the letter "t", the second stroke of the letter "t", or the second stroke of a letter "d". Stroke template entry 228a therefore points to a character description 232a for the symbol "t" and a character description 232b for the symbol "d". Of course, there are many other character descriptions that can apply to stroke template entry 228a, the two illustrated being merely examples. Likewise, stroke template entry 228b, which resembles a lowercase "c" points to character description 232b, because it can be the first stroke of the letter "d". The possible stroke number and symbol linking a stroke template entry to a character description is illustrated, by way of example, on some of the pointers 230. The sum of these pointer descriptions comprise the CHARPART interpretations for the CHARPART UNIT described previously.

Each of the character descriptions 232a, 232b, etc. also have a pointer 234 into the character part descriptions 226. More specifically, character part descriptions 226 include a plurality of areas 236a, 236b, etc. As an example, the character description 232a is of the symbol or letter "t". The number of strokes associated with this symbol is 2. Also provided in character description 232a is the position of the symbol and its stroke index. A pointer 234 connects the character description 232a to a first character part description 236a. Since the number of strokes of the symbol "t" is 2, both character part description 236a and 236b are pointed to by the character description 232a.

The character part description 236a includes a number of pieces of information. Character part description 236a includes the information CENTERX which is the ideal center position for stroke 1 of a "t", Δx which is the x deviation from this ideal center position by the stroke, CENTERY which is the ideal position of the center in the y direction for the first stroke of the letter "t", Δy which is the deviation of the stroke from this ideal, the ideal angle of this stroke (which for stroke 1 of a "t" is 0°), and the deviation Δq between this ideal and the actual angle of the first stroke. Data concerning stroke 2 is likewise provided in character part description 236b.

An important optimization is "pre-rotating" the stroke template entries 228a, 228b, etc. prior to matching them against the incoming CHARPART. Since the CHARPARTS have already been pre-rotated, a pre-rotated stroke template entry will cause rapid, angle independent matching of the CHARPART to the stroke template entry. This is very advantageous over the prior art which often requires multiple templates at various angles to represent the same stroke parts.

Figure 11A:
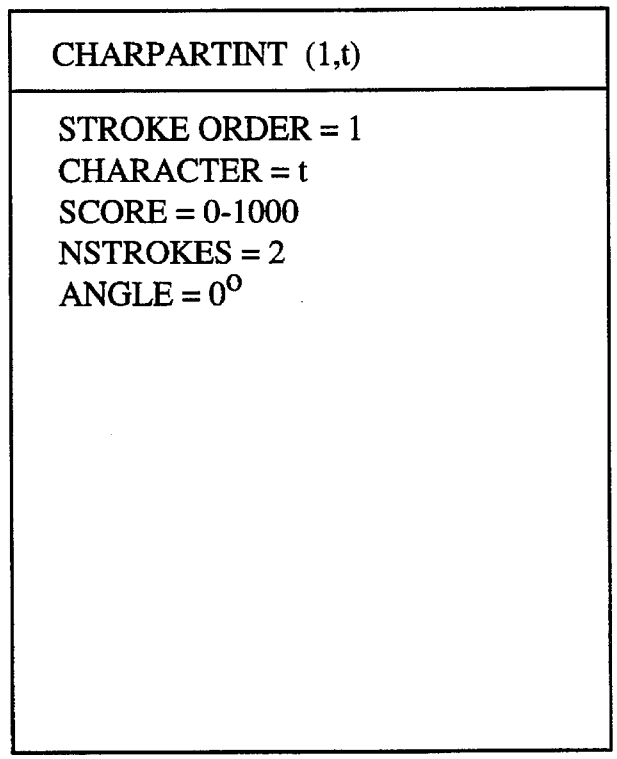
FIG. 11(a) is a pictorial representation of the data structure of a character part interpretation "CHARPARTINT" produced from the data structure of FIG. 11.

FIG. 11a is used to describe the data structure of the CHARPART interpretations for one of the interpretations (1,t). This CHARPART interpretation is one part of the interpretation field of the CHARPART UNIT. As can be seen in FIG. 11a, various parameters are stored within the CHARPART interpretation data structure. More specifically, the variable stroke order indicates that the order of this stroke is 1, i.e. this is the first stroke to be entered of a "t".

The variable character is equal to "t", and a score is assigned in the range of 0 to 1000 points depending upon the certainty of the system as to whether this particular character part is, indeed, the first stroke of the "t". The number of strokes (NSTROKES) of this letter "t" is 2, and the angle of this first stroke of the "t" is 0°.

Figure 11B:
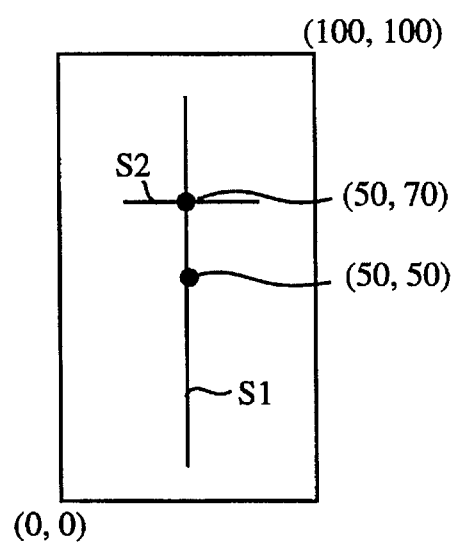
FIG. 11(b) is a pictorial representation of how the character part descriptions are derived in FIG. 11.

FIG. 11b illustrates the character part descriptions 226 of FIG. 11 in greater detail. Each character fits within a bounding box having a lower lefthand coordinate of (0,0) in having an upper right-hand coordinate of (100,100). The character "t" is within this bounding box. Stroke 1 is indicated as S1 and stroke 2 is indicated as S2. The center of stroke S1 is, therefore, (50,50) while the center of stroke S2 is about (50,70). The angle of stroke S 1 is 0°, while the angle of stroke S2 is −90°. The actual character parts are matched against this idealized version of the character parts to determine the appropriate Δx,Δy, and Δq values.

Figure 12:
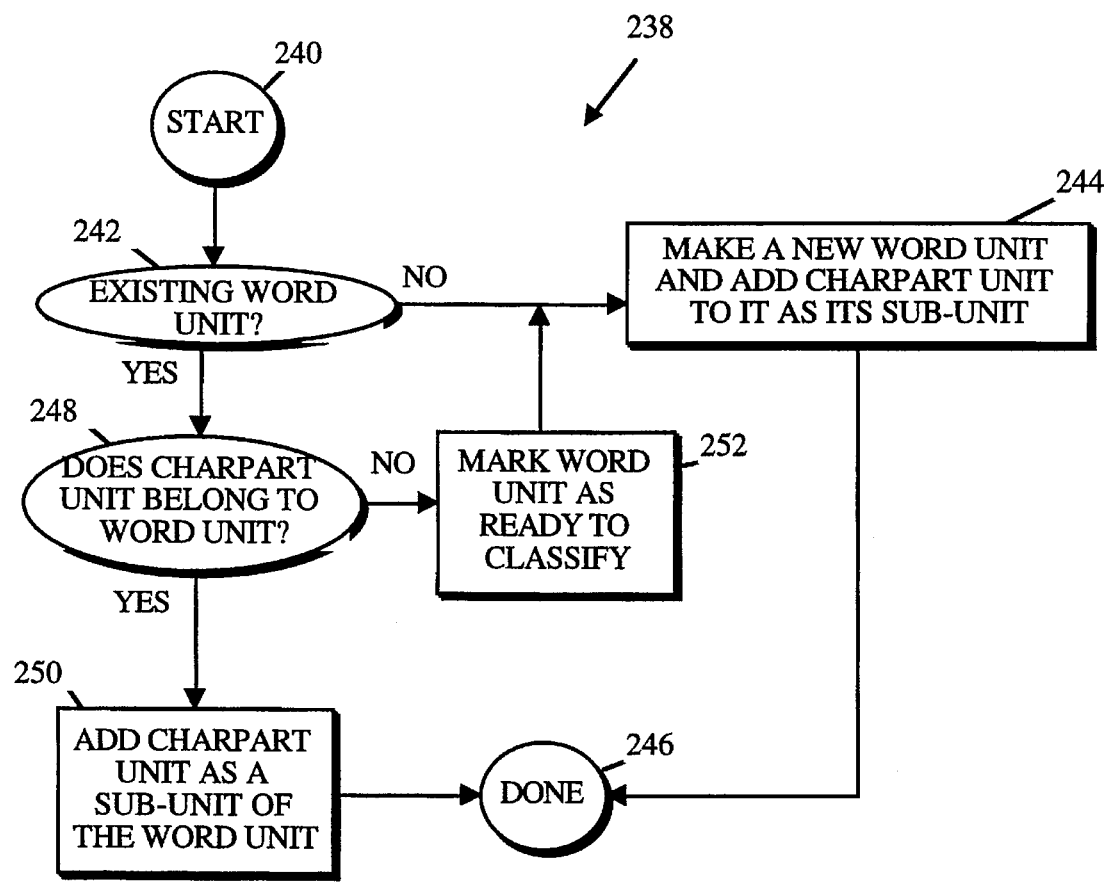
FIG. 12 is a flow diagram illustrating the "NEEDS GROUPING" call to a word recognition domain in FIG. 4.
Figure 12A:
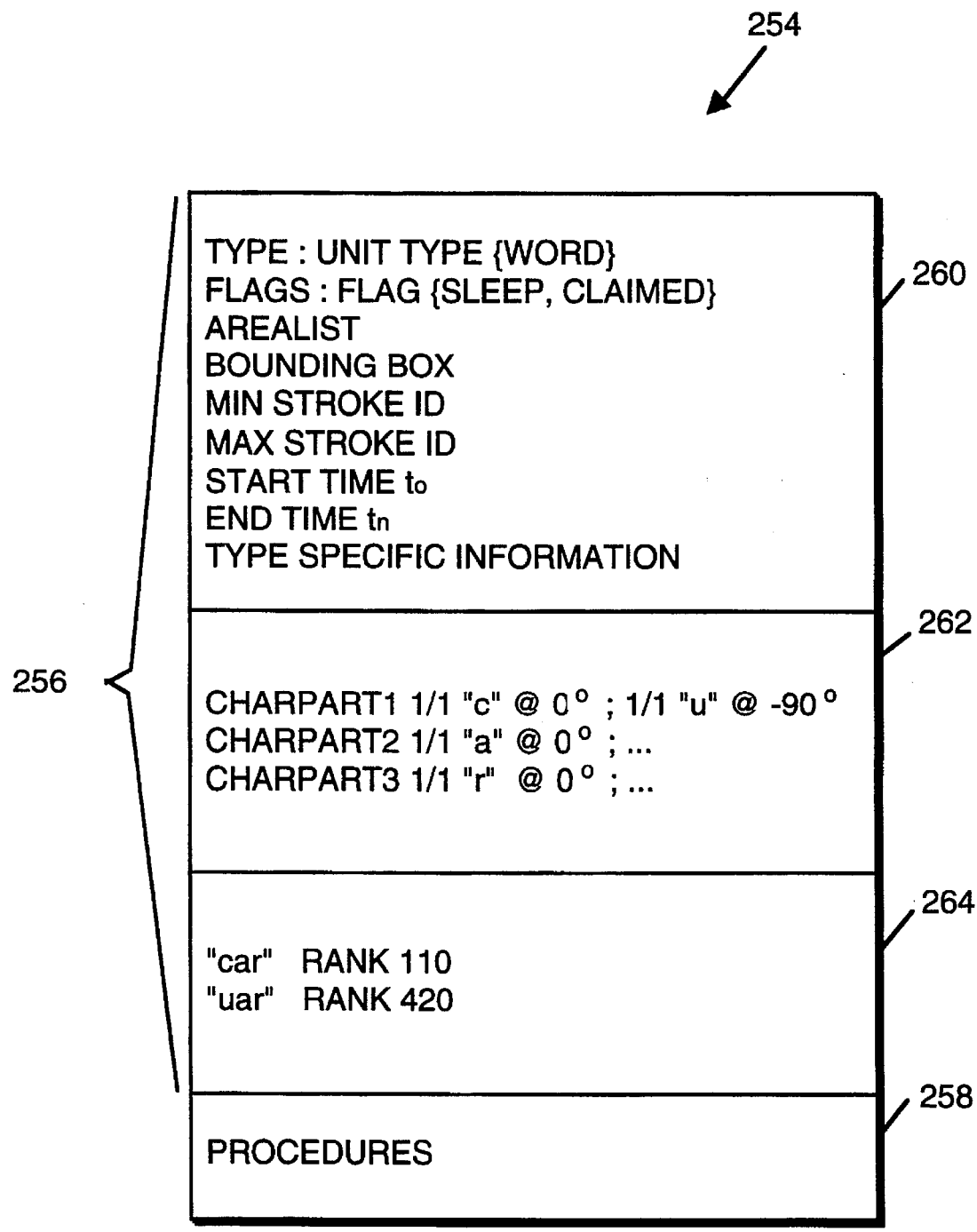
FIG. 12(a) is a pictorial depiction of a WORD UNIT produced by the process of FIG. 12.

FIG. 12 is a flow diagram illustrating the process within a word recognition domain when it receives a "NEEDS GROUPING" call from step 92 of FIG. 4. A computer implemented process 238 starts at 240 and, in a step 242, it is determined whether there is an existing word unit. If not, a new word unit is made and the CHARPART UNIT is added to it as its sub-unit. The process is then completed as indicated at 246. If it is determined by step 242 that there is an existing word unit, it is determined in a step 248 whether this new CHARPART UNIT belongs to the word unit. If not, the WORD UNIT is ready to classify and is so marked in a step 252, and a new WORD UNIT is created for the CHARPART UNIT in a step 244. If step 248 determines that a CHARPART UNIT does belong to the WORD UNIT, a step 250 adds the CHARPART UNIT as a subunit of the existing WORD UNIT and the process is completed at 242. A WORD UNIT 254 created by the process 244 of FIG. 12 is illustrated in FIG. 12a.

As before, this WORD UNIT is an object having a data portion 256 and a procedure portion 258. The data portion 256 includes a generic section 260, a subunit section 262, and an interpretation section 264. As can be seen, the subunit section 262 includes a number of CHARPARTS along with their representative CHARPART interpretations. Section 264 includes interpretations for the word which here give a rank of 110 for the word "car" and a rank of 420 for the word "uar".

Figure 13:
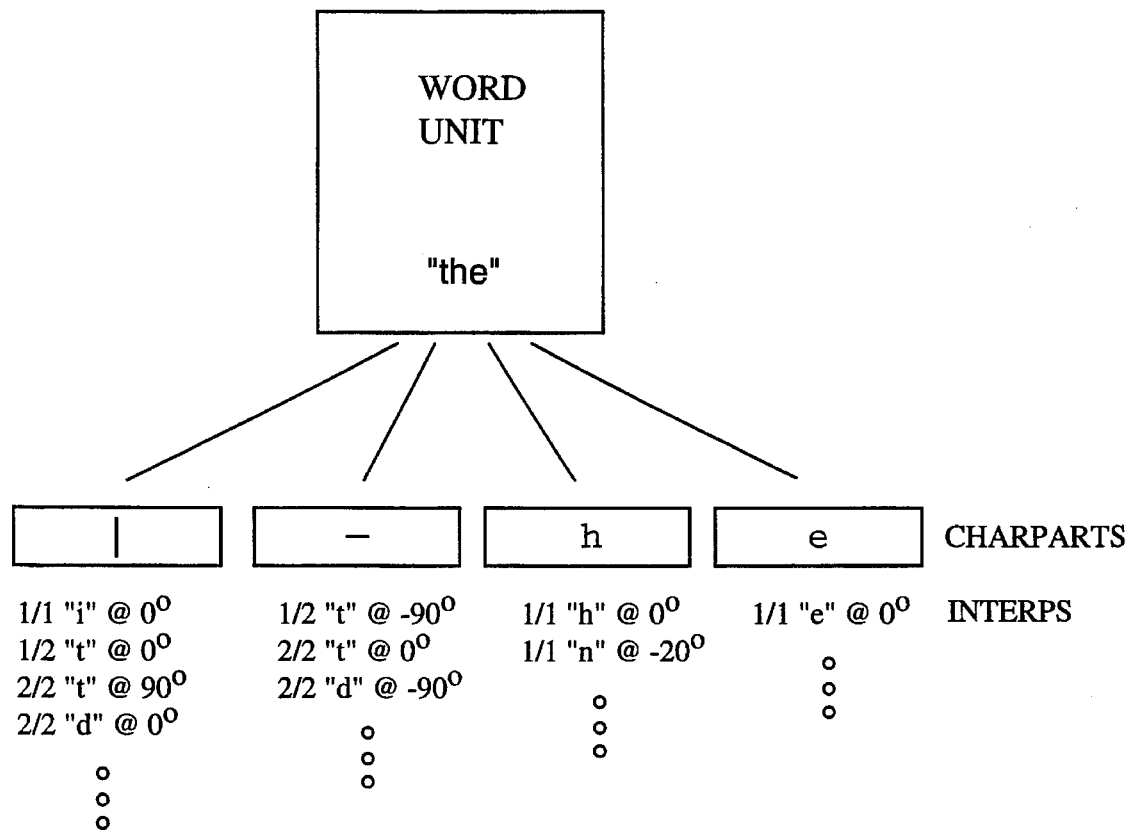
FIG. 13 is a pictorial representation of the "NEEDS CLASSIFY" call to the word recognition domain of FIG. 4.

FIG. 13 is used to illustrate the process undertaken by the Word recognition domain when a "NEEDS CLASSIFICATION" call is made by step 98 of FIG. 4. In this case, it is tempting to classify the word unit corresponding to the word "the". As can be seen in FIG. 13, the recognition domain takes the four CHARPARTS of the word "the", namely the first stroke of the letter "t", the second stroke of the letter "t", the stroke comprising the letter "h", and the stroke comprising the letter "e" and creates a list of CHARPARTS interpretations for each of these CHARPARTS. These are provided in the subunit information section of the WORD UNIT.

Figure 14:
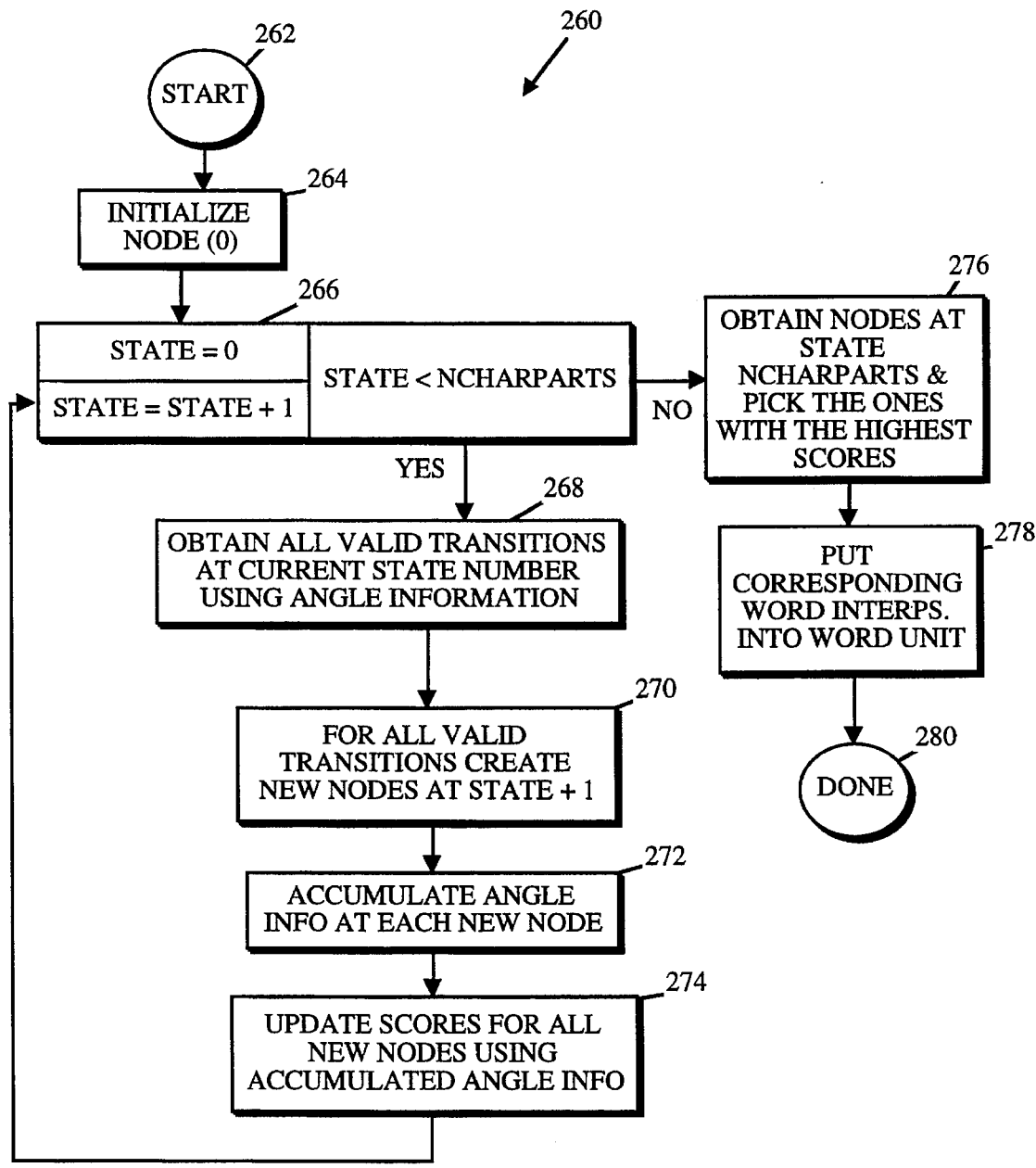
FIG. 14 is a flow diagram of a process undertaken by the word recognition domain after the "NEED CLASSIFY" call in FIG. 4.

FIG. 14 illustrates the actual process of the word recognition domain when the "NEEDS CLASSIFICATION" step 98 of FIG. 4 makes a call to the word recognition domain. The computer implemented process 260 begins at 262 and, in a step 264, a first NODE(0) is initialized. Next, in an iterative loop step 266, a variable STATE is initialized to zero, and is compared to a variable NCHARPARTS, which corresponds to the number of CHARPARTS in the word unit. If STATE is less than NCHARPARTS, a step 268 obtains all valid transitions from all nodes at the current STATES number using the angle information. Next, in a step 270, for all valid transitions new NODES are created at STATE+1. Next, in a Step 272, angle information is accumulated at each new NODE. Finally, in a step 274, the scores for all new NODES are updated using the accumulated angle information of step 272. The value of the variable STATE is then iterated by one and the loop 268–274 is repeated while STATE is less than or equal NCHARPARTS. At the completion of iterative loop step 266, a step 276 obtains NODES at the highest STATE number (which is NCHARPARTS), and picks the ones with the highest scores. These highest scored terminal nodes are put into the word interpretation section of the word unit in a step 278, and the process is completed at 280.

Figure 14A:
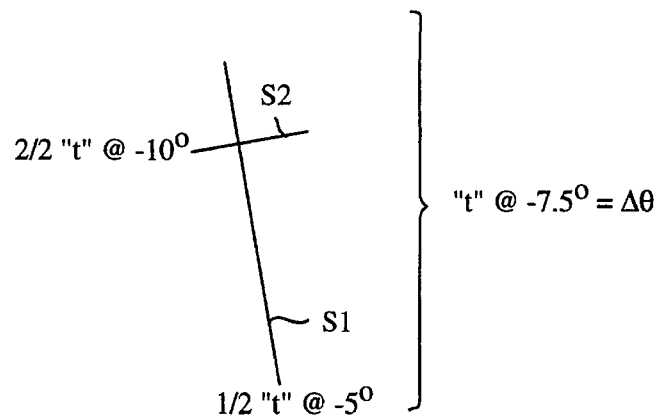
FIG. 14(a) is a pictorial depiction of a "t" produced at an angle.

In FIG. 14a, the step 272 of FIG. 14 is explained in greater detail. Here, a pair of strokes S1 and S2 which could comprise either a "t" or a "x" is stored as CHARPARTS 1 and CHARPARTS 2 in the subunit section of the word unit. The interpretation of the stroke S1 is that it could be a ½ of "t" at an angle of −5°. An interpretation of stroke S2 is that it could be stroke ⅔ of "t" at −10°. The angles of these CHARPART interpretations are taken relative to the ideal angle, which in the case of stroke S1 is 0°, and which in the case of stroke S2 is −90°. These angle errors can be averaged to provide an interpretation of a "t" at an angle of −7.5°. It is this kind of angle information that is accumulated by step 272 and which is used in the scoring process 274. Obviously, the closer that the error angle Δq is to 0°, the higher the level of confidence that this is the correct character.

Figure 14B:
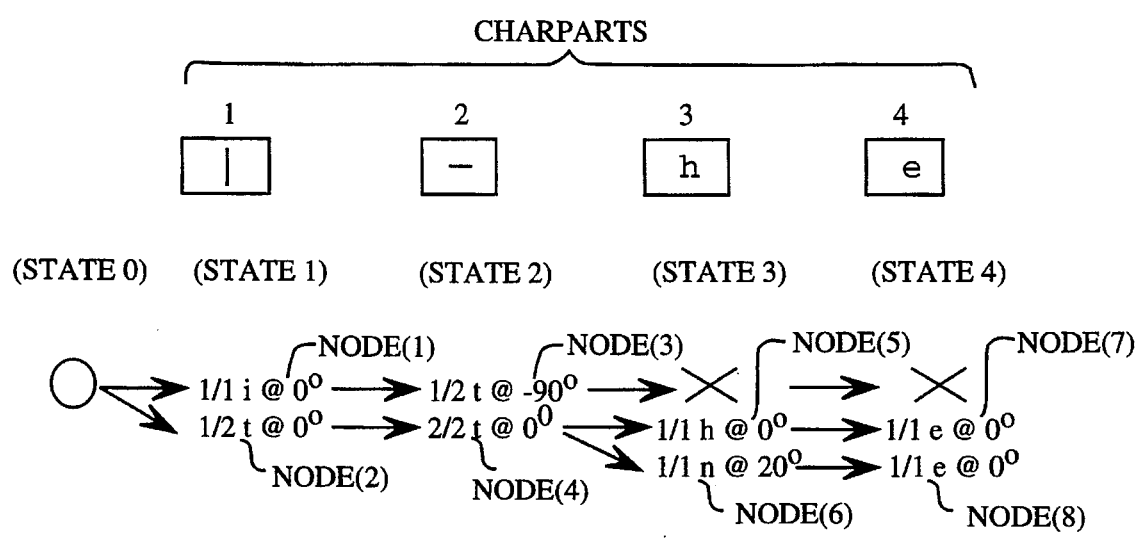
FIG. 14(b) is a depiction of a data structure produced by the process of FIG. 14 to provide word interpretations for handwritten words.

FIG. 14b illustrates the data structure developed by the process of 260. NODE(0) is an initialized node, and has pointers to two entries, i.e. NODE(1) and NODE(2). A first entry is an interpretation for the first CHARPART which is that i is ⅓ of "i" at 0°. The second interpretation is that it is ½ of "t" at 0°. STATE(2) also has two interpretations for the second CHARPART, namely that it is ½ of "t" at −90°, or ⅔ of "t" at 0°. At NODE(3), the first string of interpretations has come to a dead-end, i.e. there is no possible either ⅓ of "h" at 0° or ⅓ of "n" at 20°. Finally, at STATE(4), two possible interpretation for the CHARPARTS along this first row. However, NODE(4) has two possible interpretations into NODE(5) and NODE(6), namely, that the third CHARPART is interpretations branching off the two valid nodes of NODE(5) and NODE(6) are that the fourth CHARPART is ⅓ of "e" at 0° or ⅓ of "e" at 0°. Therefore, at NODE(7) and NODE(8), which are "terminal nodes", there are two possible interpretations for the CHARPARTS 1–4. A first interpretation is that the CHARPARTS 1–4 form the word "the", and a second interpretation is the CHARPARTS 1–4 form the word "tne". These two possible interpretations are weighted using the accumulated angle information (in addition to other available information such as character size, baseline, score, etc.) and, hopefully, the correct choice "the" is given the best (i.e. lowest) score.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for the recognition of handwritten objects on a display screen of a computer system, the computer system also having a processor and a memory, the method comprising the steps of:

receiving a handwritten stroke written on the display screen of said computer system, said stroke defining a character part and being received in a form that can be manipulated by said processor;

normalizing the stroke by adjusting the aspect ratio of a bounding box surrounding the stroke when the aspect ratio is greater than a first predetermined value or less than a second predetermined value, said step of normalizing reducing recognition errors due to distortion;

normalizing said stroke by a process including the steps of:
 (i) identifying the endpoints of the stroke,
 (ii) identifying two of the stroke's most widely spaced points, at least one of which is an endpoint of the stroke,
 (iii) defining a line between these points,
 (iv) determining an angle between a defined axis and the line defined in step (iii), and
 (v) rotating the stroke in its entirety by the angle determined in step (iv) such that at least one of the stroke's endpoints lies on said defined axis;

matching the normalized stroke against pre-rotated templates in a stroke database stored in memory to obtain at least one character part interpretation; and using the processor to recognize a handwritten object using one or more of the character part interpretations.

2. A method as recited in claim 1 wherein the first predetermined value is about 3 and the second predetermined value is about one-third.

3. A method as recited in claim 1 wherein the step of normalizing said stroke further comprises rotating the stroke by a predefined angle.

4. A method for recognizing handwritten entries created by writing on a display screen of a computer system with a stylus, the computer system also having a processor and memory, the method comprising the following steps:

receiving a handwritten stroke written on the display screen of said computer system, said stroke substantially begins when said stylus engages said display screen and substantially ends when said stylus subsequently disengages therefrom, said stroke being received in a form that can be manipulated by said processor;

normalizing said stroke by a process including the steps of:
 (i) identifying the endpoints of the stroke
 (ii) identifying two of the stroke's most widely spaced points, at least one of which is an endpoint of the stroke,
 (iii) defining a line between these points,
 (iv) determining an angle between a defined axis and the line defined in step (iii), and
 (v) rotating the stroke in its entirety by the angle determined in step (iv) such that at least one of the stroke's endpoints lies on said defined axis;

matching said normalized stroke against a stroke database stored in memory to obtain at least one character part interpretation; and using said processor to recognize a handwritten object using one or more of said character part interpretations, wherein said step of normalizing reduces recognition errors due to handwriting written at various angles.

5. The method of claim 4 further comprising a step of identifying the center of said stroke.

6. The method of claim 5 wherein the step of rotating the stroke by said angle comprises rotating the stroke about said center of the stroke.

* * * * *